US011204719B2

(12) United States Patent
Bianco et al.

(10) Patent No.: US 11,204,719 B2
(45) Date of Patent: Dec. 21, 2021

(54) SNAP READ OPTIMIZATION FOR MEDIA MANAGEMENT FOR A MEMORY SUB-SYSTEM

(71) Applicant: Micron Technology, Inc., Boise, ID (US)

(72) Inventors: Antonio David Bianco, Boise, ID (US); Shakeel Isamohiuddin Bukhari, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 62 days.

(21) Appl. No.: 16/721,721

(22) Filed: Dec. 19, 2019

(65) Prior Publication Data

US 2021/0191649 A1    Jun. 24, 2021

(51) Int. Cl.
*G06F 3/06* (2006.01)
*G06F 7/08* (2006.01)
*G06F 12/02* (2006.01)

(52) U.S. Cl.
CPC .......... *G06F 3/0659* (2013.01); *G06F 3/0604* (2013.01); *G06F 3/0647* (2013.01); *G06F 3/0673* (2013.01); *G06F 7/08* (2013.01); *G06F 12/0253* (2013.01); *G06F 2212/7205* (2013.01)

(58) Field of Classification Search
CPC .. G06F 3/0659; G06F 12/0253; G06F 3/0604; G06F 7/08; G06F 3/0647; G06F 3/0673; G06F 2212/7205
See application file for complete search history.

(56) References Cited

U.S. PATENT DOCUMENTS

| 2011/0248872 | A1* | 10/2011 | Korodi | H03M 7/40 341/67 |
|---|---|---|---|---|
| 2017/0201273 | A1* | 7/2017 | Bonke | H03M 13/2909 |
| 2017/0242788 | A1* | 8/2017 | Ahmed | G06F 3/0616 |
| 2017/0242789 | A1* | 8/2017 | Ahmed | G06F 12/0246 |
| 2018/0091172 | A1* | 3/2018 | Ilani | G06F 11/1012 |

* cited by examiner

*Primary Examiner* — Sean D Rossiter
(74) *Attorney, Agent, or Firm* — Holland & Hart LLP

(57) ABSTRACT

A plurality of entries associated with a media management operation for a plurality of transfer units are stored. A respective destination location for each of the respective transfer units are determined in connection with the garbage procedure such that a subset of the plurality of transfer units aligns with a codeword boundary on the memory page. A plurality of write commands in connection with the media management operation are issued based at least in part on the determining.

20 Claims, 5 Drawing Sheets

SNAP READ OPTIMIZATION FOR MEDIA MANAGEMENT FOR A MEMORY SUB-SYSTEM

TECHNICAL FIELD

The following relates generally to a memory sub-system and more specifically to snap read optimization for media management for a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various examples of the disclosure. The drawings, however, should not be taken to limit the disclosure to the specific examples, but are for explanation and understanding only.

DETAILED DESCRIPTION

Figure 1:
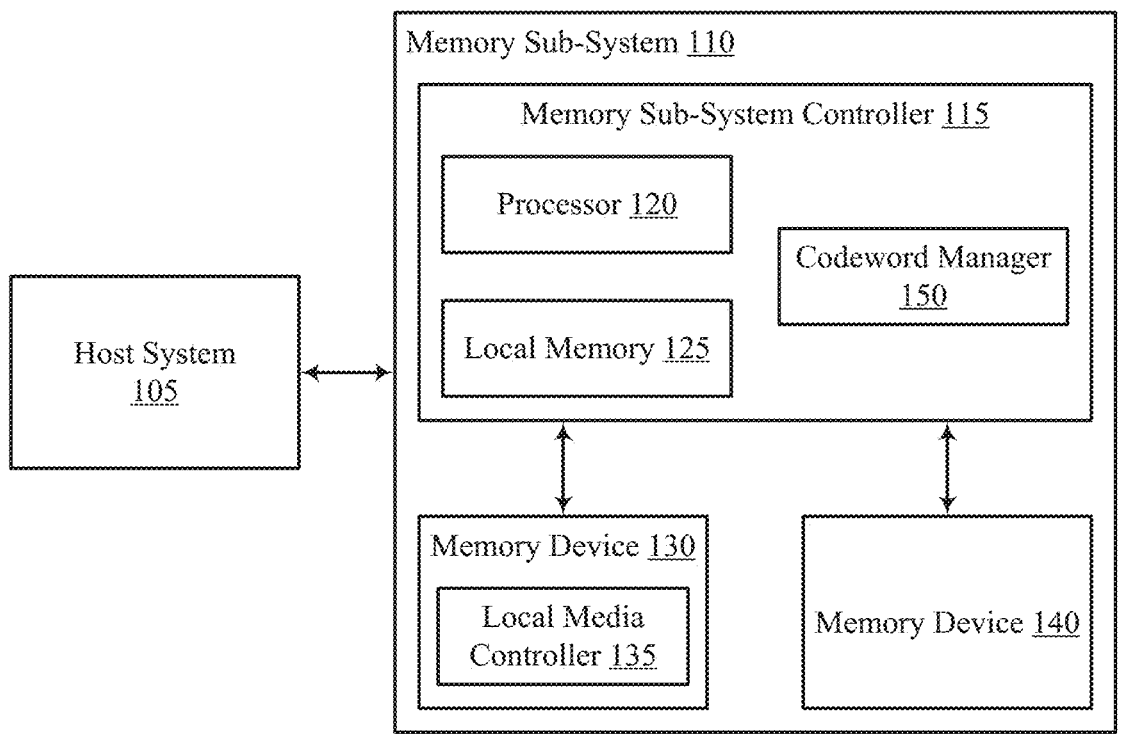
FIG. 1 illustrates an example computing system that includes a memory sub-system in accordance with some examples of the present disclosure.

Aspects of the present disclosure are directed to a snap read optimization for media management for a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time.

A page of a block can contain valid data, invalid data, or no data. Invalid data is data that is marked as outdated as a new version of the data is stored on the memory device. Invalid data includes data that was previously written but is no longer associated with a valid logical address, such as a logical address referenced by a host system in a physical to logical (P2L) mapping table. Valid data is the most recent version of such data being stored on the memory device. A memory sub-system can mark data as invalid based on information received, for example, from an operating system. A page that does not contain data includes a page that has been previously erased, and not yet written to.

A memory sub-system controller can perform operations for media management algorithms, such as wear leveling, refresh, garbage collection, scrub, etc. A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and released as a free block for subsequent write operations. Garbage collection is a set of media management operations that include, for example, selecting a block that contains valid and invalid data, selecting pages in the block that contain valid data, copying the valid data to new locations (e.g., free pages in another block), marking the data in the previously selected pages as invalid, and erasing the selected block.

"Garbage collection" hereinafter refers to selecting a block, rewriting the valid data from the selected block to another block, and erasing all invalid data and valid data stored at the selected block. The valid data from multiple selected blocks can be copied to a smaller number of other blocks and the selected blocks can then be erased. As a result, the number of blocks that have been erased can be increased such that more blocks are available to store subsequent data from a host system.

During garbage collection, valid data of the block to be erased is initially read into and stored by a buffer based on one or more read commands issued by a memory sub-system controller and the corresponding page (e.g., the page on which the valid data is contained) is erased. The valid data can then be written (e.g., re-written) to the memory device (e.g., to a different page of the memory device).

During a snap read procedure, a single codeword (that includes multiple TUs) may be read based on a single read command. For snap reads to be performed successfully, data for a snap read (e.g., one or more TUs) is aligned with a codeword boundary on a page of the memory device. In some cases, however, data can span multiple codewords on a page of the memory device such that a set of data of a given size (e.g., 4 kilobytes (KB) or 8 KB) does not align with codeword boundaries on the page of the memory device. Arrangement of data in this manner degrades the performance and likelihood of snap read operations as data unaligned with codeword boundaries does not qualify for snap reads.

Aspects of the present disclosure address the above and other deficiencies by having a memory sub-system that includes a scoreboard for grouping entries (e.g., during a garbage collection procedure) based on the codeword(s) associated with the data. For example, when TUs are read from a block during a garbage collection procedure, the scoreboard can group the entries according to a codeword boundary from which the TUs were read. For example, entries of the scoreboard can be sorted such that valid TUs align with a codeword boundary on a page of the memory device. Accordingly, valid data can be written to a destination location (e.g., a block) based on the codeword boundary. By maintaining or aligning with codeword boundaries during a garbage collection procedure, the overall performance of the memory sub-system can be increased and data that had previously qualified for snap reads can be written such that it still qualifies for snap reads, which can improve read performance of the memory sub-system.

FIG. 1 illustrates an example computing system 100 that includes a memory sub-system 110 in accordance with some embodiments of the present disclosure. The computing environment can include a host system 105 and a memory sub-system 110. The memory sub-system 110 can include media, such as one or more non-volatile memory devices (e.g., memory device 130), one or more volatile memory devices (e.g., memory device 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and a non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some examples, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, universal serial bus (USB) interface, Fiber Channel, Small Computer System Interface (SCSI), Serial Attached SCSI (SAS), a dual in-line memory module (DIMM) interface (e.g., DIMM socket interface that supports Double Data Rate (DDR)), etc. The physical host interface can be used to transmit data between the host system 105 and the memory sub-system 110. The host system 105 can further utilize a non-volatile memory Express (NVMe) interface to access the memory components (e.g., memory devices 130) when the memory sub-system 110 is coupled with the host system 105 by the PCIe interface. The physical host interface can provide an interface for passing control, address, data, and other signals between the memory sub-system 110 and the host system 105.

The memory devices can include any combination of the different types of non-volatile memory devices and/or volatile memory devices. The volatile memory devices (e.g., memory device 140) can be, but are not limited to, random access memory (RAM), such as dynamic RAM (DRAM) and synchronous DRAM (SDRAM).

Some examples of non-volatile memory devices (e.g., memory device 130) includes a NAND type flash memory. Another example of non-volatile memory device is write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as NAND type flash memory are described, the memory device 130 can be based on any other type of non-volatile memory, such as read-only memory (ROM), phase change memory (PCM), self-selecting memory, other chalcogenide based memories, ferroelectric RAM (FeRAM), magneto RAM (MRAM), negative-or (NOR) flash memory, electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include read-only memory (ROM) for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a codeword manager 150 that can perform a media management operation, where data is migrated from one location to another location independent of any direct host system interaction. In some examples, the codeword manager 150 can pack valid data together, to free space for new writes, for error avoidance, for wear leveling, and/or to restore redundant array of independent nodes (RAIN) parity protection in the event of an error. Additionally or alternatively, the codeword manager 150 can move or copy data from one or more blocks (e.g., one or more blocks of NAND cells) into a destination block according to one or more codeword boundaries associated with the data.

In some examples, the memory sub-system controller 115 includes at least a portion of the codeword manager 150. For example, the memory sub-system controller 115 can include a processor 120 (e.g., a processing device) configured to execute instructions stored in local memory 125 for performing the operations described herein. In some examples, the codeword manager 150 is part of the host system 105, an application, or an operating system.

The codeword manager 150 can store various entries associated with a media management operation and determine a codeword boundary associated with each entry. For example, the codeword manager 150 can group one or more entries based on each entry's boundary. After the block has been erased, which can be conducted by the codeword manager 150 or another component, the pages of valid data can be written (e.g., re-written) to the block in based on the grouping. That is, the codeword manager 150 can preserve the order of data (e.g., TUs) within a codeword to ensure that it may be read in a subsequent snap read. For example, a block of data spanning multiple pages having both valid and invalid data can be written to one or more codewords such that the data remains qualifies for future snap reads. Further details with regards to the operations of the codeword manager 150 are described below.

Figure 2:
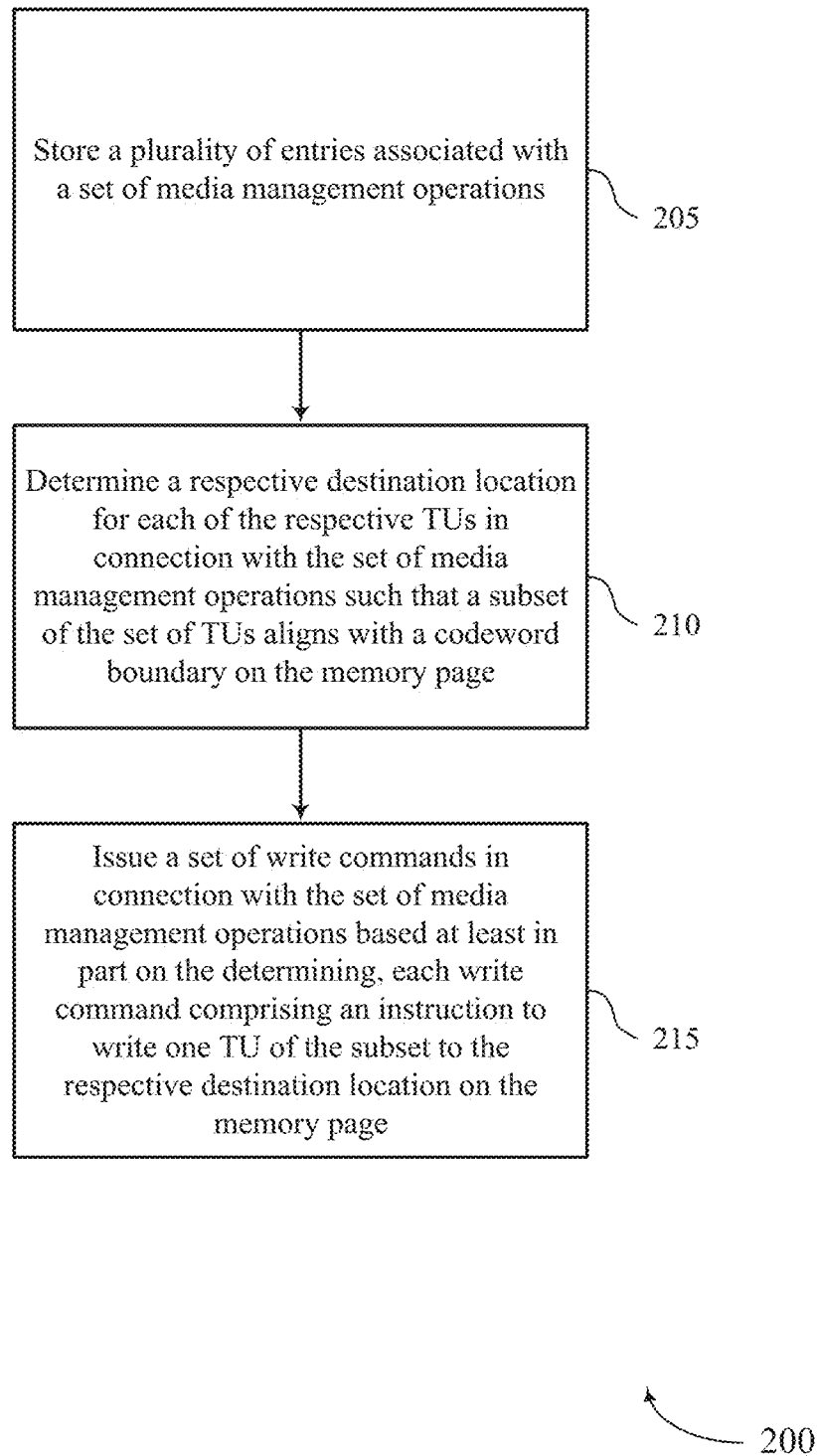
FIG. 2 is a flow diagram of an example method to optimize a snap read for media management for a memory sub-system in accordance with some examples of the present disclosure.

FIG. 2 is a flow diagram 200 of an example method to optimize a snap read for media management for a memory sub-system in accordance with some examples of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 200 is performed by the codeword manager 150 of FIG. 1. Although shown in a particular sequence or order, unless otherwise specified, the order of the operations can be modified. Thus, the illustrated examples should be understood only as examples, and the illustrated operations can be performed in a different order, and some operations can be performed in parallel. Additionally, one or more operations can be omitted in various examples. Thus, not all operations are required in every example. Other method flows are possible.

At operation 205, the processing device can store a set of entries associated with a set of media management operations for a set of transfer units (TUs). In some examples, each entry can include a location of a respective TU of the set of TUs on a memory page associated with a memory sub-system. In some examples, the method 200 can include sorting the set of entries based at least in part on the locations of the respective TUs. In some examples, the respective destination locations can be determined based at least in part on the sorting. In some examples, the method 200 can include sorting the set of entries such that entries corresponding to the subset of the set of TUs are contiguous. In some examples, the method 200 can include sorting the set of entries according to a sorting algorithm that groups entries for subsets of the set of TUs based at least in part on a codeword size of the memory page. In some examples, each of the subsets of the set of TUs correspond to the codeword size. In some examples, a data size corresponding to the subset of the set of TUs is the same as a codeword size associated with the codeword boundary on the memory page.

At operation 210, the processing device can determine a respective destination location for each of the respective TUs in connection with the set of media management operations such that a subset of the set of TUs aligns with a codeword boundary on the memory page. In some examples, the method 200 can include determining respective destination locations for a second subset of the set of TUs such that the second subset aligns with a second codeword boundary on the memory page. In some examples, the second subset can be nonoverlapping with the first sub set.

At operation 215, the processing device can issue a set of write commands in connection with the set of media management operations based at least in part on the determining. In some examples, each write command can include an instruction to write one TU of the subset to the respective destination location on the memory page. In some examples, the method 200 can include performing a read operation for the subset of the set of TUs after issuing the set of write commands.

Figure 3:
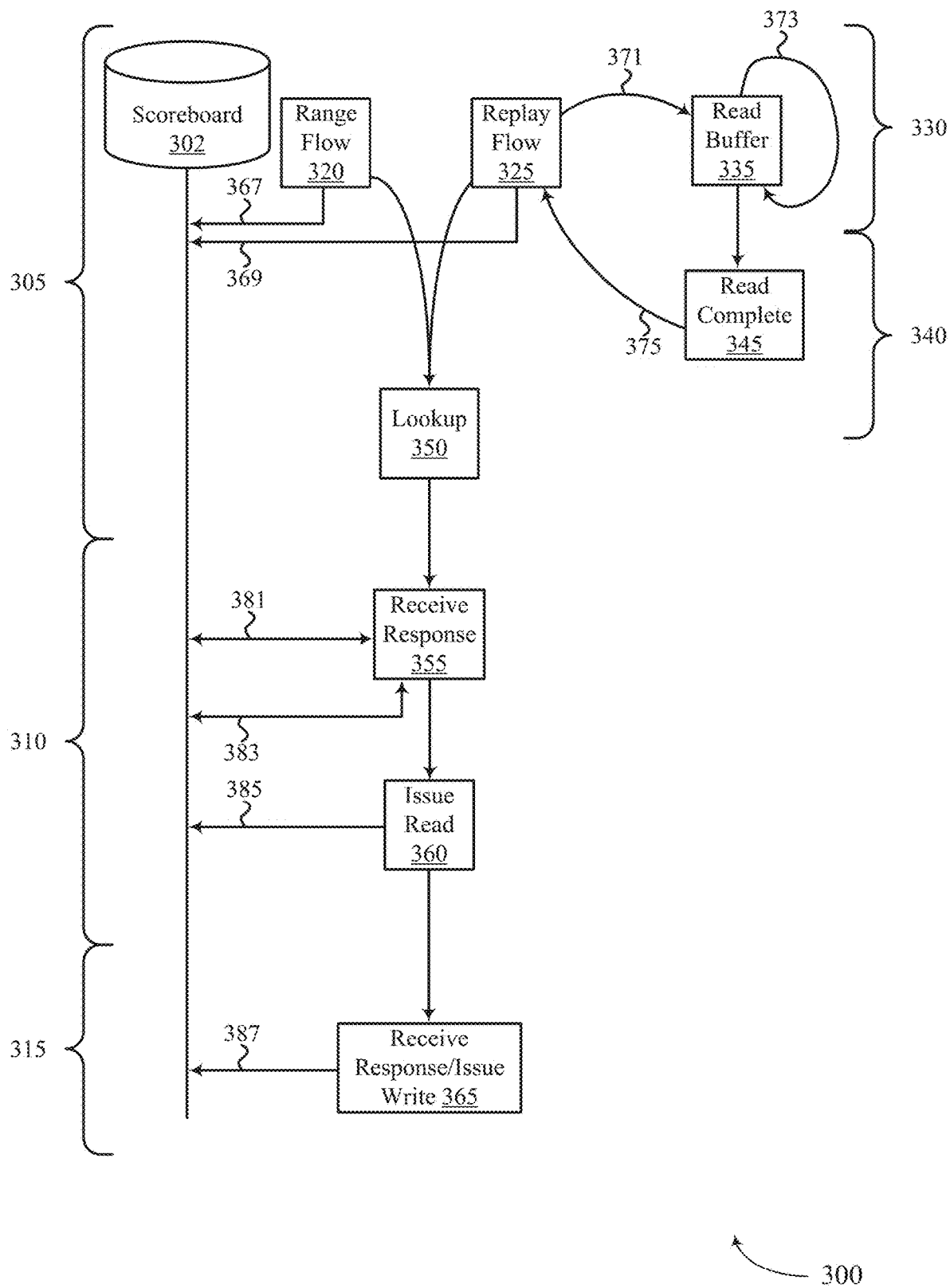
FIG. 3 is a block diagram of an example method to optimize a snap read for media management for a memory sub-system in accordance with some examples of the present disclosure.

FIG. 3 illustrates an example of a method diagram 300 for snap read optimization for media management of a memory sub-system in accordance with examples as disclosed herein. The method diagram 300 illustrates stages for identifying valid data (e.g., at stage 305), reading valid data (e.g., at stage 310), and issuing a write command (e.g., at stage 315). In some examples, the operations performed as described with reference to FIG. 3 can be implemented at a memory sub-system and can utilize a scoreboard 302. Further, the operations can be performed according to the operations of a host system and/or local media controller, and can be implemented based on a setting of a state machine. In some examples, the method diagram 300 can illustrate one or more procedures for optimizing snap reads during a media management operation (e.g., a range flow procedure 320 and a replay flow procedure 325).

The method diagram 300 can illustrate one or more operations for media management (e.g., media management operations for garbage collection). During a media management operation, data can be migrated (e.g., internally within a memory sub-system) from one location (e.g., from a source memory address) to another location (e.g., to a destination memory address) independent of any direct host system interaction. Garbage collection can be performed to pack valid data together, to free space for new writes, for error avoidance, for wear leveling, and/or to restore RAIN parity protection in the event of an error. Additionally or alternatively, garbage collection can consist of moving or copying data from one or more source blocks (e.g., one or more blocks of NAND cells) into one or more destination blocks. In some examples, garbage collection can result in data consolidation to free resources (e.g., NAND cells) for subsequent erase and new write processing.

In some examples, data transferred during a media management operation can be or can be referred to as a transfer unit (TU) and can be the smallest size of data internally managed by a memory sub-system controller (e.g., by the processor 120 as described with reference to FIG. 1), local media controller, or by a host system (e.g., host system 105 of FIG. 1). One or more TUs can be associated with (e.g., located within) a codeword, and can correspond to a logical address (e.g., a TU address (TUA)) and a physical address (e.g., an abstracted physical address such as a flash logical address (FLA), which can relate to a physical address of the NAND cell referred to as a platform physical address (PPA)). In order to consolidate data and/or free resources for subsequent access operations, the TU can be written to a new location (e.g., a destination address), and the original block (e.g., the block from which the TU is moved) can be erased. Candidates (e.g., a blocks) for garbage collection can be selected using a tree (a pool, a list, a queue, etc.). In some examples, the candidates can be maintained by the scoreboard 302. As discussed herein, it can be beneficial to write TUs to a new block such that a given set of TUs reside within the boundaries of the same codeword to allow the written data to remain qualified for snap reads. That is, it can be beneficial to write TUs to a new block in the same manner that the TUs were originally written by the host system. Maintaining the same codeword boundaries during a write operation can improve the overall performance of the memory sub-system.

In order to move (e.g., write) valid TUs to a destination block within a same codeword, entries associated with the valid TUs can be grouped using the scoreboard 302 prior to writing out the TUs to the destination block. Each entry can include at least a TUA and a FLA associated with a TU. Additionally or alternatively, among other parameters that can be included in the linked list, the linked list can include a next node identifier. The next node identifier can indicate a subsequent TU for the media management operation. Accordingly, utilizing a list where each entry indicates a next (e.g., a subsequent) TU can allow for valid TUs to be written to a destination block such that they align with a particular codeword boundary.

In some examples, one or more entries can be maintained by the scoreboard 302. An entry can consist of a list (e.g., a queue, a pool, etc.) of TUs for a media management operation. For example, a read operation can occur and the TUA and/or FLA for each TU can be stored (e.g., grouped) to the scoreboard 302 according to a codeword associated with the TU. The storing of each TUA and/or FLA can generate a list (e.g., a linked list) at the scoreboard 302. The order of the list (e.g., the order that read commands are grouped based on associated codewords) can allow for the TUs to be written to a destination block such that the TUs align with a boundary of an associated codeword. In other examples, the order of the linked list can be calculated on the fly using a predictive algorithm (e.g., an algorithm to predict the order that the host system can issue read commands).

At stage 305, one or more operations can be performed to identify valid data (e.g., TUs). Although a count of valid TUs in a block can be readily available (e.g., available to a controller), a location of each valid TU can be identified. In some examples, a location of valid TUs can be identified using a range flow procedure 320 or a replay flow procedure 325. A range flow procedure 320 can include processing commands that move or copy an entire memory sub-system. Additionally or alternatively, a replay flow procedure 325 can use a buffer (e.g., read buffer 335) and can cycle through physical locations in a block.

At stage 310, one or more operations can be performed to read valid data (e.g., TUs) that was identified at 305. For example, after valid TUs are identified, an FLA corresponding to each valid TU can be compared with entries maintained by the scoreboard 302. If the FLA corresponding to a valid TU matches an FLA maintained by the scoreboard 302, then a read command associated with the valid TU can occur. Conversely, if the FLAs do not match, the entry maintained by the scoreboard 302 can be released (e.g., moved to the end of the linked list). In other examples, if the FLAs do not match, the system can be configured to continue cycling through valid TUs until a FLA matches the entry maintained by the scoreboard 302.

At stage 315, one or more operations can be performed to write valid data (e.g., TUs) that was read at stage 310. As discussed herein, when an FLA corresponding to a valid TU matches an FLA maintained by the scoreboard 102, a read command associated with the valid TU is issued. Additionally or alternatively, based on the read command being issued, data associated with the valid TU can be written (e.g., moved) into a destination block (e.g., to a destination address). Due to the use of a linked list, data associated with valid TUs can be written to a destination block sequentially.

At stage 305, various methods can be employed to determine valid data (e.g., valid TUs). For example, a replay flow procedure 325 can support the determination of valid data by iterating through various TUs stored within a buffer (e.g., within a read buffer 335). The buffer can include one or more addresses (e.g., TUAs and/or FLAs) that correspond to locations in a block from which a respective TU was read. In some examples, a replay flow procedure 325 can be selected based on one or more settings associated with a mode register and/or a controller (e.g., a memory sub-system controller, a local media controller). That is, using a replay flow procedure 325 can be optional. In some examples, a replay flow procedure 325 can be performed in multiple stages (e.g., a first stage 330 and a second stage 340).

When the replay flow procedure 325 is employed, a signal 371 can be received by the read buffer 335 during the first stage 330. The signal 371 can initiate the read buffer 335 to cycle through one or more TUs (e.g., as illustrated by 373)). That is, the read buffer 335 can map (e.g., determine, identify, etc.) a TUA and an FLA of a potentially valid TU according to an order in which read commands are issued. During the second stage 340, the TUA and FLA of each TU can be identified and provided to the scoreboard 302 (e.g., via signal 375 and/or signal 369). In some examples, the first stage 330 and the second stage 340 can be asynchronous (e.g., a duration can occur between the onset of the first stage 330 and the completion of the second stage 340).

After identifying and providing the TUA and the FLA to the scoreboard the list (e.g., the linked list) can be compiled at the scoreboard 302. In some examples, a lookup of the TUA and FLA can then be issued (e.g., at 350) to determine whether the associated data remains valid, and if so, the valid data can be written to a destination block (e.g., sequentially). In some examples, the lookup 350 can occur in an order that read responses are received, and can be performed to determine whether the TUA and FLA match an entry stored at the scoreboard 302. Because system can utilize a linked list, the TUAs and FLAs stored to the scoreboard 302 can be compared to a respective TUA and FLA of each received read response (e.g., compared in order). Depending on the results of the comparison, a write command can be issued and the TU can be written to a destination block. In some examples, TUs being associated with a same codeword can grouped together and written to the destination block consecutively.

A range flow procedure 320 can include processing commands that fold data (e.g., move and organize data) of an entire memory sub-system. For example, a range flow procedure 320 can be selected based on one or more settings associated with a mode register and/or a controller (e.g., memory sub-system controller, a local media controller). That is, using a range flow procedure 320 can be optional. In some examples, a range flow procedure 320 can include a request being made to indicate a start and end listing of TUAs to be scanned. In some examples, when such a request is made (i.e., identified by a controller and/or a host system), a flag is set to direct firmware along the listing of TUAs to be scanned.

When a range flow procedure 320 is employed, a read command for each FLA in a particular block can be issued. A corresponding TUA and FLA can be stored to the scoreboard 302 as part of a list (e.g., a linked list). In some examples, a lookup of the TUA and FLA can then be issued (e.g., at 350) to determine whether the associated data remains valid, and to write (e.g., sequentially) the valid data to a destination block. Because the system can utilize a linked list, the TUA and FLA identified can be compared with a first entry of the list (e.g., the head of the list). Depending on the results of the comparison, a write command can be issued and the TU can be written to a destination block. In some examples, TUs being associated with a same codeword can grouped together and written to the destination block consecutively.

In some examples, both a range flow procedure 320 and a replay flow procedure 325 can result in a lookup 350 being performed to determine whether a read response (e.g., a TUA and FLA corresponding to a read response) matches an entry stored at the scoreboard 302. Accordingly, the TUA and FLA associated with the read response can be provided to the scoreboard 302 via signal 381. The signal 381 can be transmitted to the scoreboard 302 by a controller or other component. In some examples, the signal 381 can be transmitted to the scoreboard 302 at a first time (e.g., at 350; not shown) and a result of the comparison can be received at a second time (e.g., at 355 via signal 383). Accordingly, in some examples, a portion of the comparison can occur at (e.g., during) the stage 305 and at (e.g., during) the stage 310. In some examples, operations performed at 350 and at 355 can be asynchronous (e.g., a duration can occur between operations performed by various components at 350 and 355).

As read responses are received, a corresponding TUA and FLA can be compared with a first entry (e.g., the head of the list) entries stored at the scoreboard 302. In some instances, the TUA and FLA might not match the first entry. For example, the comparison of the first entry with the first received TUA and FLA can indicate that the entries do not match. In such an example, the first entry of the list can be released (e.g., moved to the bottom of the list). Accordingly, the TUA and FLA can be compared with a subsequent entry (or entries) in the list until a match is determined. Once a match is determined, a read of the associated TU can be issued (e.g., at 360), and the TU can be subsequently written to a destination block (e.g., at 365, which can occur at the stage 315). In some examples, the stage 310 and the stage 315 can be asynchronous (e.g., a duration can occur between the two stages).

According to some aspects, entries associated with a same codeword (or codewords) can grouped together in the scoreboard 302. For example, entries associated with a same codeword can be grouped together in the scoreboard 302 such that, when written to the destination block (e.g., when write commands are issued), the entries remain associated with a same codeword at the destination block. That is, write commands can be issued for the entries grouped together such that the valid TUs are written to the same codeword and align with codeword boundaries on the destination block. In some examples, to group the entries of the scoreboard 302, the entries can be sorted using a sorting algorithm that groups entries for TUs based on a codeword size of the memory page at the destination block or based on a relative location of the TU with respect to a source memory page (e.g., with respect to a codeword boundary on the source memory page). For instance, a set of TUs of a given size (e.g., 4 KB or 8 KB) selected for a media management operation and sorted such that entries corresponding to the set of TUs are group together in the scoreboard 302. By grouping together the entries corresponding to the set of TUs in the scoreboard 302, write commands can be issued for each entry in the scoreboard 302 sequentially (or according to some other order) such that the TUs are written to a same codeword (e.g., align with codeword boundaries) at the destination block. Such techniques can allow data (e.g., TUs) that was previously stored within a same codeword (and thus eligible for a snap read) to maintain being qualified for a snap read after the media management operation (e.g., due to the TUs being written to the destination block at a same codeword or within codeword boundaries on a memory page of the destination block).

Figure 4:
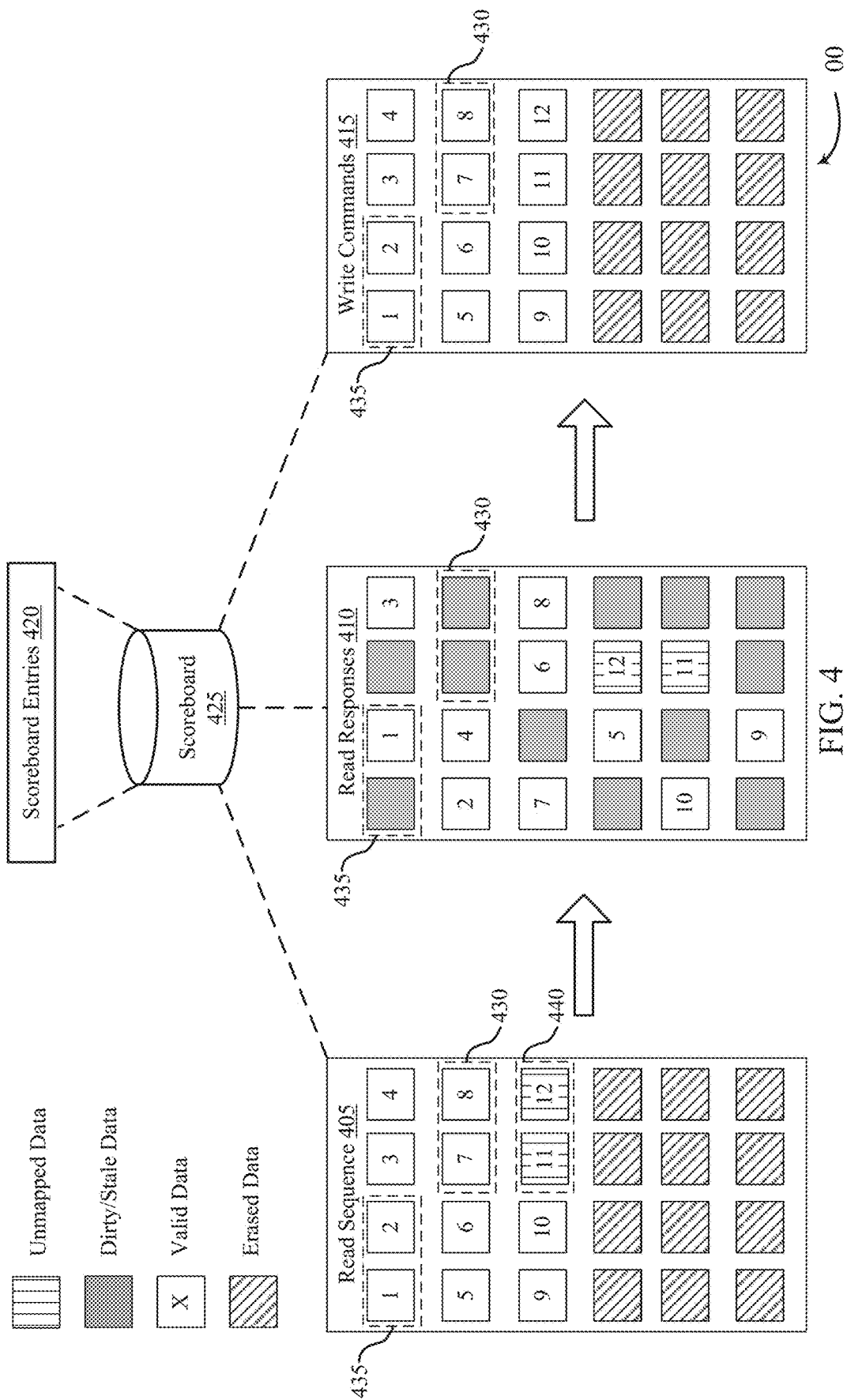
FIG. 4 is a diagram of an example scoreboard for performing snap read optimization for media management for a memory sub-system in accordance with some examples of the present disclosure.

FIG. 4 is a block diagram 400 of an example scoreboard for performing snap read optimization for media management for a memory sub-system in accordance with some examples of the present disclosure. The media management operation illustrates a read sequence 405, read responses 410, and write commands 415. In some examples, the write commands 415 can be based on the order of the read sequence 405 and the read responses 410 during a media management operation. Additionally or alternatively, the media management operation can be implemented using a scoreboard 425, which can be an example of a scoreboard 302 as described with reference to FIG. 3. In some examples, the scoreboard 425 can include one or more scoreboard entries 420 that facilitate the media management operation, such as the entries of the scoreboard 302 as described with reference to FIG. 3.

In some examples, FIG. 4 illustrates operations of a media management operation. As discussed herein, a media management operation can occur to migrate data from one location to another location independent of any direct host system interaction. In the context of FIG. 4, each of the read sequence 405, the read responses 410, and the write commands 415 can be associated with a block (e.g., a block of data). Each block can include one or more pages capable of storing a finite amount of data. For example, each block can include 32 pages that are each capable of storing 4 KB or 8 KB of data (or other amount). For illustrative purposes, each of the read sequence 405, the read responses 410, and the write commands 415 illustrate twelve (12) blocks of valid data (numbered 1 through 12) and various blocks of dirty/stale data and/or erased data. Dirty data is the latest version of data in cache memory that had not been saved to media (e.g., NAND). Stale data includes data that was previously written but is no longer associated with a valid logical address, such as a logical address referenced by a host system (e.g., in a physical to logical (P2L) mapping table). Each block of valid data (e.g., 1 through 12) can be or can be referred to as a TU.

In some examples, each TU can be associated with one or more codewords (e.g., one of codewords 430, 435). Each codeword can include a boundary, and multiple TUs can fall within a single boundary. For example, as shown in FIG. 4, the boundaries of the codeword 430 can include a first and second TU. That is, the first and second TUs can be associated with a first codeword.

A range flow procedure (e.g., range flow procedure 320 as described with reference to FIG. 3) and/or a replay flow procedure (e.g., replay flow procedure 325 as described with reference to FIG. 3) can be associated with a read sequence 405. For example, a range flow procedure and/or a replay flow procedure can issue one or more read commands for reading TUs for the media management operation. As shown in FIG. 4, and for illustrative purposes only, a read sequence 405 can issue one or more read commands for TUs 1 through 12. The read sequence 405 can issue the read commands simultaneously, such that a read command for each subsequent TU is issued in order (i.e., a read command for each TU is issued consecutively). The read commands can be stored to the scoreboard 425 as a list (e.g., a linked list, a circular buffer, or a tree). In some examples, a TUA and FLA associated with each TU can be stored as a scoreboard entry 420 in a scoreboard 425 (e.g., scoreboard 302 of FIG. 3). By storing an entry associated with each codeword, entries having a same codeword can be grouped together. Accordingly, when written to a destination block, the entries can be associated with a same codeword.

In some examples, the scoreboard entries 420 can store a respective value associated with each TU. Accordingly, when an associated read response is received (i.e., a response associated with a TUA, FLA, and/or codeword stored to the scoreboard 425), the respective value can be updated. Based on the value stored in the scoreboard entries 420, the TU can be written to a destination block in sequential order. A listing of potential states for a single scoreboard entry is illustrated below in Table 1.

TABLE 1

| Value | Meaning |
| --- | --- |
| 0 | Empty |
| 1 | Found TUA/FLA pair |
| 2 | Lookup request sent |
| 3 | Lookup response received |
| 4 | Buffer allocated |
| 5 | Read request sent |
| 6 | Read response received |
| 7 | Write request sent |

As shown in Table 1, the scoreboard 425 can include a variety of entries. Each of the pages (and TUs 1 through 12) can be associated with a respective entry. For example, some pages (and TUs) can be associated with a same entry, and other pages (and TUs) can be associated with a different entry. Each entry represents a current state of a respective page and/or TU.

In some examples, entry "0" represents an empty state. An empty state can indicate that the page is empty (e.g., it has been previously erased) and no valid data is to be read from the page and/or that the page is free to be written to. In some examples, entry "1" represents that a TUA and FLA have been identified. In some examples, entry "2" represents that a lookup has been performed on the TUA and FLA to determine if the associated data is still valid.

In some examples, entry "3" represents that a response regarding whether the data associated with the TUA and FLA is valid. If the data is valid, the entry remains on the scoreboard. If the data is invalid, the entry can be moved to the end of the linked list and assigned a "0". In some examples, entry "4" represents the valid data being allocated to the buffer (e.g., the read buffer 335 with reference to FIG. 3). In some examples, entry "5" represents that the valid data associated with the TUA and FLA has been read.

In some examples, entry "6" represents that the valid data associated with the TUA and FLA has been received. In some examples, entry "7" represents that the valid read data is to be written. After the data has been written, the entry can be assigned a "0" and can be moved to the end of the linked list. This can indicate that the data was successfully (and sequentially) written back.

After issuing a read sequence 405, read responses 410 can be received (e.g., at the scoreboard 425) in a non-sequential order. For example, as shown in FIG. 4, each response can be received in a non-sequential order or at least in a different order than the read sequence 405 was issued. In some examples, valid data can be received in a different order than the read sequence 405, received valid data can separated by one or more blocks of dirty and/or stale data, or both. Receiving the read responses 410 in a non-sequential order can be due to a variety of reasons, including but not limited to, particular channels being temporarily utilized for different operations (e.g., for host read operations). If the read responses 410 are written to a destination block in the received order (i.e., the non-sequential order), an overall performance of the memory sub-system can be reduced. Accordingly, it can be beneficial to issue write commands 415 based on determining a codeword boundary associated with the identified entry as shown in FIG. 4.

Additionally or alternatively, one or more codewords (e.g., codeword 440) may be unmapped by a host device. For example, codeword 440 can become unmapped due to an occurrence of one or more errors when data is moved or transferred (e.g., as a result of one or more commands from a host device), improper updating of codeword mapping, or the like, which can result in data loss or other issues. In a traditional memory system, unmapped codewords (e.g., codeword 440) can be read (e.g., as part of the read sequence 405) and written (e.g., as part of the write commands 415) to the memory sub-system in an order different from the order in which read responses 410 are received. After writing, the mapping of the unmapped codeword 440 can be updated (e.g., in a P2L table), allowing to host to issue other access commands (e.g., read commands, write commands) to the codeword 440. This also allows codeword 440 to be written to the destination blocks in an order that is capable of utilizing quick read operations such as snap reads, improving the overall performance of the memory sub-system.

In order to issue the write commands 415 such that the TUs align with a codeword boundary, an entry associated with the respective TU can be maintained by the scoreboard 425. As discussed herein, as read responses 410 are received, the entries can be sorted according to the location of the respective TU. For example, the scoreboard 425 can be configured to sort each entry based on an associated codeword or a relative location of the TU with respect to a codeword boundary. For example, TUs "1" and "2" can be associated with codeword 435, and TUs "7" and "8" can be associated with codeword 430. After the read responses 410 are received, the scoreboard 425 can be configured to sort each entry (e.g., entries "1", "2", "7", and "8") according to the codewords 430 and 435. Because entries "1" and "2" are associated with the codeword 435, and because entries "7" and "8" are associated with the codeword 430, entries "1" and "2" can be grouped and entries "7" and "8" can be grouped. That is, a write command 415 associated with the entries "1" and "2" can be issued such that the entries remain associated with the same codeword. Similarly, a write command 415 associated with the entries "7" and "8" can be issued such that the entries remain associated with the same codeword. In the case that dirty and/or stale data is received between entries that will be similarly grouped, the scoreboard can update an entry associated with each TU such that the valid data and/or the dirty and/or stale is rearranged.

Thus, when the write commands 415 are issued, the TUs can be written such that each is associated with a same codeword as in the read sequence 405.

In some cases, when the valid data and/or the dirty and/or stale is rearranged, data can be inserted between TUs in order to ensure that a set of TUs (e.g., of a given size) is associated with a same codeword (e.g., of the given size). For example, invalid data, data not associated with the read operation, and the like can be inserted to ensure that each TU remains associated with a same codeword when written to the destination block. Additionally or alternatively, data that was eligible for snap reads prior to garbage collection (e.g., due to the data being associated with a same codeword) can remain qualified for snap reads after collection. For instance, entries in the scoreboard 425 can be sorted such that TUs stored at a source location and spanning multiple codewords can be grouped together and write commands 415 can be issued that write the TUs to a same codeword (e.g., within codeword boundaries) at a destination location.

Figure 5:
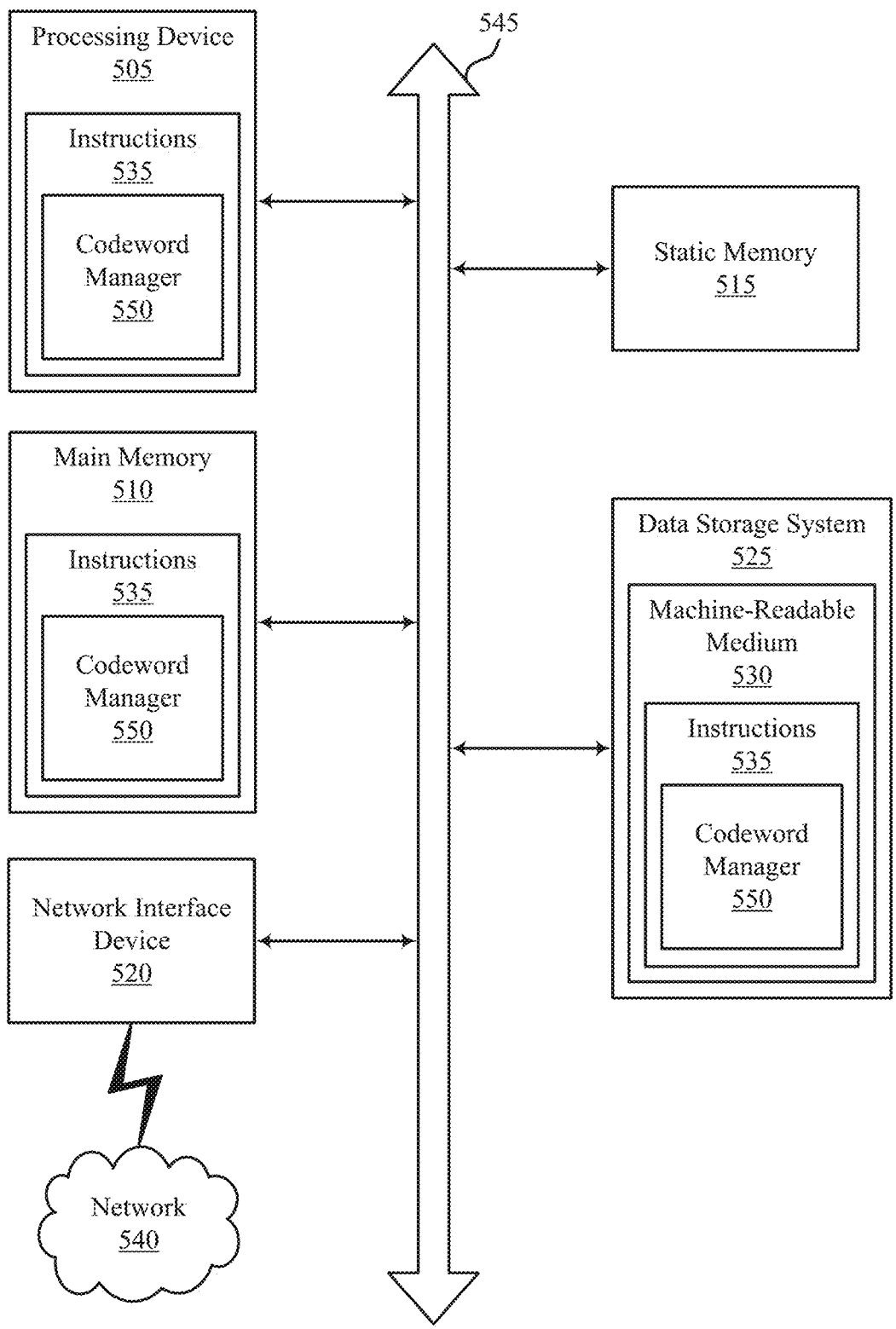
FIG. 5 is a block diagram of an example computer system in which examples of the present disclosure can operate.

FIG. 5 illustrates an example machine of a computer system 500 that supports snap read optimization for a set of media management operations in accordance with examples as disclosed herein. The computer system 500 can include a set of instructions, for causing the machine to perform any one or more of the techniques described herein. In some examples, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the codeword manager 150 described with reference to FIG. 1). In some examples, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., ROM, flash memory, DRAM such as synchronous DRAM (SDRAM) or Rambus DRAM (RDRAM), etc.), a static memory 515 (e.g., flash memory, static RAM (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an ASIC, an FPGA, a DSP, network processor, or the like. The processing device 505 is configured to execute instructions 535 for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a codeword manager 550 (e.g., the codeword manager 150 described with reference to FIG. 1). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method, comprising:
    storing a plurality of entries associated with a set of media management operations for a plurality of transfer units, each entry comprising a location of a respective transfer unit of the plurality of transfer units on a memory page associated with a memory sub-system;
    determining a respective destination location for each of the respective transfer units in connection with the set of media management operations based at least in part on a respective alignment with a codeword boundary such that a subset of the plurality of transfer units aligns with the codeword boundary on the memory page; and
    issuing a plurality of write commands in connection with the set of media management operations based at least in part on the determining, each write command comprising an instruction to write one transfer unit of the subset to the respective destination location on the memory page.

2. The method of claim 1, further comprising:
    sorting the plurality of entries based at least in part on the locations of the respective transfer units, wherein the respective destination locations are determined based at least in part on the sorting.

3. The method of claim 2, further comprising:
sorting the plurality of entries such that entries corresponding to the subset of the plurality of transfer units are contiguous.

4. The method of claim 1, wherein each of the subsets of the plurality of transfer units correspond to the codeword size.

5. The method of claim 1, wherein a data size corresponding to the subset of the plurality of transfer units is the same as a codeword size associated with the codeword boundary on the memory page.

6. The method of claim 1, further comprising:
performing a read operation for the subset of the plurality of transfer units after issuing the plurality of write commands.

7. The method of claim 1, further comprising:
determining respective destination locations for a second subset of the plurality of transfer units such that the second subset aligns with a second codeword boundary on the memory page, the second subset nonoverlapping with a first subset.

8. A system comprising:
a plurality of memory devices; and
a processing device, operatively coupled with the plurality of memory devices, to:
store a plurality of entries corresponding to a plurality of transfer units associated with a set of media management operations for the plurality of memory devices;
determine a respective destination location for each of the plurality of transfer units, based at least in part on a respective alignment with a codeword boundary, such that a subset of the plurality of transfer units correspond to the codeword on a memory page; and
issue a plurality of write commands in connection with the set of media management operations based at least in part on the determining, the plurality of write commands comprising instructions to write the subset of the plurality of transfer units to respective destination locations on the memory page.

9. The system of claim 8, further comprising:
the processing device further to:
group entries corresponding to the plurality of transfer units according to a codeword size of the codeword, wherein the respective destination locations are determined based at least in part on the grouped entries.

10. The system of claim 8, further comprising:
the processing device further to:
group entries for a first subset contiguously, wherein the first subset corresponds to a data size that is the same as a codeword size of the codeword.

11. The system of claim 8, further comprising:
the processing device further to:
sort the plurality of entries such that entries corresponding to a first subset are contiguous, wherein the first subset corresponds to a data size that is the same as a codeword size of the codeword.

12. A non-transitory computer-readable storage medium comprising instructions that, when executed by a processing device, cause the processing device to:
store a plurality of entries associated with a set of media management operations for a plurality of transfer units, each entry comprising a location of a respective transfer unit of the plurality of transfer units on a memory page associated with a memory sub-system;
determine a respective destination location for each of the respective transfer units in connection with the set of media management operations based at least in part on a respective alignment with a codeword boundary such that a subset of the plurality of transfer units aligns with the codeword boundary on the memory page; and
issue a plurality of write commands in connection with the set of media management operations based at least in part on the determining, each write command comprising an instruction to write one transfer unit of the subset to the respective destination location on the memory page.

13. The non-transitory computer-readable storage medium of claim 12, wherein the processing device is further to:
sort the plurality of entries based at least in part on the locations of the respective transfer units, wherein the respective destination locations are determined based at least in part on the sorting.

14. The non-transitory computer-readable storage medium of claim 13, wherein the processing device is further to:
sort the plurality of entries such that entries corresponding to the subset of the plurality of transfer units are contiguous.

15. The non-transitory computer-readable storage medium of claim 12, wherein a subset of the plurality of transfer units corresponds to a codeword size.

16. The non-transitory computer-readable storage medium of claim 12, wherein a data size corresponding to the subset of the plurality of transfer units is the same as a codeword size associated with the codeword boundary on the memory page.

17. The non-transitory computer-readable storage medium of claim 12, wherein the processing device is further to:
perform a read operation for the subset of the plurality of transfer units after issuing the plurality of write commands.

18. The non-transitory computer-readable storage medium of claim 12, wherein the processing device is further to:
determine respective destination locations for a second subset of the plurality of transfer units such that the second subset aligns with a second codeword boundary on the memory page, the second subset nonoverlapping with a first subset.

19. A method, comprising:
storing a plurality of entries associated with a set of media management operations for a plurality of transfer units, each entry comprising a location of a respective transfer unit of the plurality of transfer units on a memory page associated with a memory sub-system;
determining a respective destination location for each of the respective transfer units in connection with the set of media management operations such that a subset of the plurality of transfer units aligns with a codeword boundary on the memory page;
sorting the plurality of entries based at least in part on the locations of the respective transfer units, wherein the respective destination locations are determined based at least in part on the sorting;
sorting the plurality of entries according to a sorting algorithm that groups entries for subsets of the plurality of transfer units based at least in part on a codeword size of the memory page; and issuing a plurality of write commands in connection with the set of media management operations based at least in part on the determining, each write command comprising an instruction to write one transfer unit of the subset to the respective destination location on the memory page.

20. A non-transitory computer-readable storage medium comprising instructions that, when executed by a processing device, cause the processing device to:
    store a plurality of entries associated with a set of media management operations for a plurality of transfer units, each entry comprising a location of a respective transfer unit of the plurality of transfer units on a memory page associated with a memory sub-system;
    determine a respective destination location for each of the respective transfer units in connection with the set of media management operations such that a subset of the plurality of transfer units aligns with a codeword boundary on the memory page;
    sort the plurality of entries based at least in part on the locations of the respective transfer units, wherein the respective destination locations are determined based at least in part on the sorting;
    sort the plurality of entries according to a sorting algorithm that groups entries for subsets of the plurality of transfer units based at least in part on a codeword size of the memory page; and
    issue a plurality of write commands in connection with the set of media management operations based at least in part on the determining, each write command comprising an instruction to write one transfer unit of the subset to the respective destination location on the memory page.

* * * * *